(12) United States Patent
Kuroda

(10) Patent No.: US 8,879,079 B2
(45) Date of Patent: Nov. 4, 2014

(54) INFORMATION PROCESSING APPARATUS THAT DISPLAYS WEB PAGE, METHOD OF CONTROLLING INFORMATION PROCESSING APPARATUS, AND STORAGE MEDIUM

(75) Inventor: Shigeki Kuroda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 13/593,544

(22) Filed: Aug. 24, 2012

(65) Prior Publication Data

US 2013/0050733 A1    Feb. 28, 2013

(30) Foreign Application Priority Data

Aug. 30, 2011    (JP) ................................. 2011-187105

(51) Int. Cl.
*G06F 3/12*     (2006.01)
*G06K 15/00*    (2006.01)
*H04N 1/00*     (2006.01)

(52) U.S. Cl.
CPC ....... *H04N 1/00464* (2013.01); *H04N 1/00244* (2013.01); *H04N 1/00498* (2013.01); *H04N 1/00501* (2013.01); *H04N 1/00474* (2013.01); *H04N 2201/0094* (2013.01); *G06K 15/005* (2013.01); *H04N 1/00424* (2013.01)
USPC ........ 358/1.13; 358/1.15; 358/1.16; 358/1.18

(58) Field of Classification Search
CPC .................................................... G06K 15/02
USPC ............... 358/1.13, 1.16, 1.15, 1.2, 1.18, 1.1, 358/403, 476, 296; 345/594, 636, 655, 656, 345/661, 667, 676, 682, 440, 156, 173, 10, 345/11; 709/203, 227, 226, 212, 216, 231, 709/201
See application file for complete search history.

(56) References Cited

U.S. PATENT DOCUMENTS

| | | | |
|---|---|---|---|
| 2007/0211297 A1* | 9/2007 | Kuroda ........................ | 358/1.18 |
| 2008/0244000 A1* | 10/2008 | Nakamura et al. ............ | 709/203 |
| 2011/0007351 A1* | 1/2011 | Kurumasa et al. ........... | 358/1.15 |
| 2011/0137637 A1* | 6/2011 | Takahashi ........................ | 704/8 |
| 2011/0320928 A1* | 12/2011 | Kuroda ........................ | 715/234 |
| 2012/0194826 A1* | 8/2012 | Kunori ............................ | 358/1.2 |
| 2012/0265857 A1* | 10/2012 | Kano ............................ | 709/219 |

FOREIGN PATENT DOCUMENTS

JP         2009-70109 A     4/2009

* cited by examiner

*Primary Examiner* — Ngon Nguyen
(74) *Attorney, Agent, or Firm* — Carter, DeLuca, Farrell & Schmidt, LLP

(57) ABSTRACT

An information processing apparatus which can be operated very easily by users when the users display web pages in different display languages. An MFP is connected to a web server via a network. When registering a view button in which a URL for identify contents is specified, a window manager registers a display language in which the contents are displayed in association with the URL, and displays the view button on a display. When a view button is selected, a web browser transmits URL associated with the selected view button to thereby designate contents associated with URL and send the display language to thereby specify the display language in which the contents are displayed.

10 Claims, 9 Drawing Sheets

*FIG.6*

| TOTAL NUMBER OF FAVORITES | | 3 |
|---|---|---|
| FAVORITE NUMBER | ITEMS | VALUES |
| 1 | BUTTON ID | 1 |
| | BUTTON NAME | お気に入り A |
| | URL | http://xxx/AAAA |
| | DISPLAY LANGUAGE | jp |
| 2 | BUTTON ID | 2 |
| | BUTTON NAME | Favorite A |
| | URL | http://xxx/AAAA |
| | DISPLAY LANGUAGE | en |
| 3 | BUTTON ID | 3 |
| | BUTTON NAME | Favorit A |
| | URL | http://xxx/AAAA |
| | DISPLAY LANGUAGE | de |
| ... | BUTTON ID | |
| | BUTTON NAME | |
| | URL | |
| | DISPLAY LANGUAGE | |

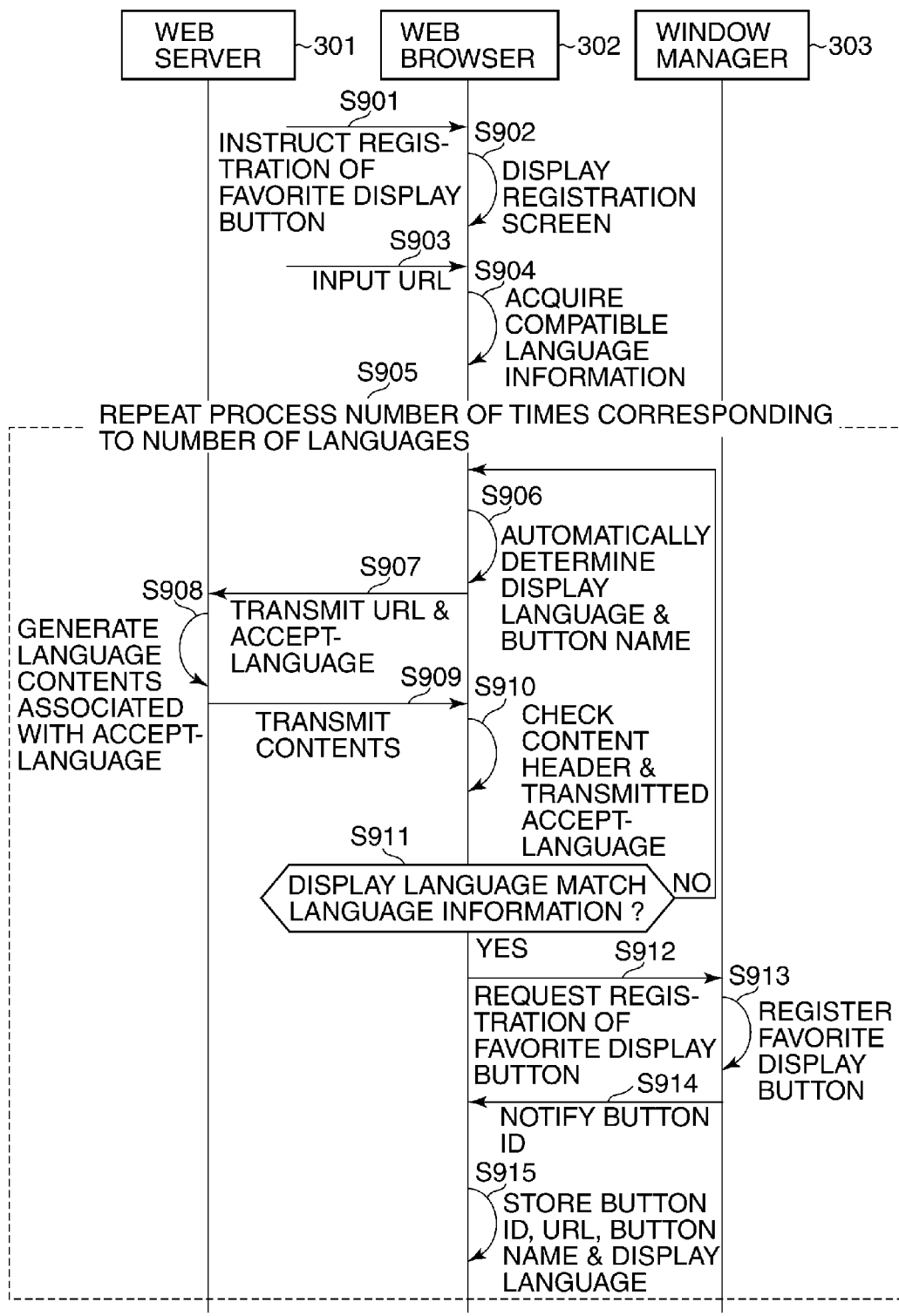

INFORMATION PROCESSING APPARATUS THAT DISPLAYS WEB PAGE, METHOD OF CONTROLLING INFORMATION PROCESSING APPARATUS, AND STORAGE MEDIUM

BACKGROUND OF THE INVENTION

1. Field of the Invention

The present invention relates to an information processing apparatus, a method of controlling the same, and a storage medium, and more particularly to a method of displaying web contents received from an external apparatus, on a screen.

2. Description of the Related Art

In general, to view contents provided by a web server, which is an external apparatus, a web browser equipped in an information processing apparatus is used. Some information processing apparatuses of this type are capable of registering shortcut buttons (favorite display buttons) of the web browser associated with respective URL address of the web server, as favorites, respectively.

When a favorite display button is selected, the web browser is displayed on an operation screen. The web browser accesses the web server that has a URL address registered in the favorite display button, and displays the contents of the web server.

Further, communication between the web browser and web sites on the web server is performed using the HTTP protocol. In the HTTP protocol, data transmitted from the web browser to the web server is provided with a field called a request header section. The request header section includes an Accept-Language request-header field.

The web browser as a client is capable of designating a display language for the Accept-Language request-header field. Upon receipt of the Accept-Language request-header field, the web server transmits the web contents (hereinafter, also simply referred to as "contents") in the requested display language to the client.

Here, a description will be given of an example of the Accept-Language request-header field.

Now, let it be assumed that "en" has been designated for the Accept-Language request-header field as follows:

Accept-Language: en

Here, the web browser as a client requests the web contents in English (en) from the web server. If it is possible to transmit the web contents in English to the client, the web server transmits the web contents in English to the client. On the other hand, if there are no contents in English, the web server sends the contents in a default display language or an error to the web browser (client).

The display language designated for the Accept-Language request-header field is designated by a language-setting function, which is one of functions for setting options of the web browser.

Further, there has been proposed a technique in which a management server, which is a web server, stores associated contents formed by translating target contents of web pages in database as other web pages associated with the web pages (see Japanese Patent Laid-Open Publication No. 2009-70109). When instructed to extract the associated contents, the management server extracts the associated contents from the database, and provides the contents to the client.

By the way, in an environment that requires display of web pages in different languages from each other, there is a demand for displaying contents of favorites having the same URL address in different languages. Examples of such an environment include an office in which there are a large number of users who speak different languages, and a convenience store in which a number of unspecified users use a multi-function peripheral (MFP).

However, in registering the above-mentioned favorites, since the favorites are registered in a manner associated with the URL address of the web server, the number of favorites having the same URL address which can be registered is only one.

Therefore, when web servers are to be accessed which have the same URL address and switch between display languages by referring to the Accept-Language request-header field, it is necessary to select a favorite after switching between display languages by configuration of the settings of the web browser. Further, in the MFP, it is necessary to select a favorite display button after switching between display languages of the MFP.

As described above, to display web pages in different display languages, it is required to select a favorite after switching between display languages, which requires the user to perform the troublesome operations particularly under an environment in which a large number of users use the MFP.

SUMMARY OF THE INVENTION

The present invention provides an information processing apparatus which can be operated very easily by users when the users display web pages in different display languages, a method of controlling the information processing apparatus, and a storage medium.

In a first aspect of the present invention, there is provided an information processing apparatus that communicates with an external apparatus via a network, and views contents stored in the external apparatus, the information processing apparatus including a display section for displaying information, comprising a registration unit configured to register, when registering a view button in which an address for identify the contents is specified, a display language in which the contents are displayed, in association with the address, a display control unit configured to display the view button on the display section after the view button is registered, and an access unit configured to transmit, when the view button is selected, the address and the display language associated with the view button, to thereby receive contents identified by the address and associated with the display language.

In a second aspect of the present invention, there is provided a method of controlling an information processing apparatus that communicates with an external apparatus via a network, and views contents stored in the external apparatus, the information processing apparatus including a display section for displaying information, comprising registering, when registering a view button in which an address for identify the contents is specified, a display language in which the contents are displayed, in association with the address, displaying the view button on the display section after the view button is registered, and transmitting, when the view button is selected, the address and the display language associated with the view button, to thereby receive contents identified by the address and associated with the display language.

In a third aspect of the present invention, there is provided a non-transitory computer-readable storage medium storing a computer-executable control program for causing a computer to execute a method of controlling an information processing apparatus that communicates with an external apparatus via a network, and views contents stored in the external apparatus, the information processing apparatus including a display section for displaying information, wherein the method comprises registering, when registering a view button in which an address for identify the contents is specified, a display language in which the contents are displayed, in association with the address, displaying the view button on the display section after the view button is registered, and transmitting, when the view button is selected, the address and the display language associated with the view button, to thereby receive contents identified by the address and associated with the display language.

According to the present invention, it is possible to register a display language desired to be requested, together with an address (URL) in a view button, such as a favorite display button. Therefore, even in an environment that requires display of contents in different languages, it is possible to view the contents in a desired display language, without switching between display languages.

Further, in the MFP, it is possible to display the contents in the respective display languages without switching between the display languages of the MFP.

Further features of the present invention will become apparent from the following description of exemplary embodiments with reference to the attached drawings.

BRIEF DESCRIPTION OF THE DRAWINGS

FIG. 6 is a view showing an example of an address data table storing address data described with reference to FIG. 3.

FIG. 9 is a sequence diagram useful in explaining a series of processes executed when a button is registered as a favorite item in a web browser in an MFP as an information processing apparatus according to a second embodiment of the present invention.

DESCRIPTION OF THE EMBODIMENTS

The present invention will now be described in detail below with reference to the accompanying drawings showing embodiments thereof.

Figure 1:
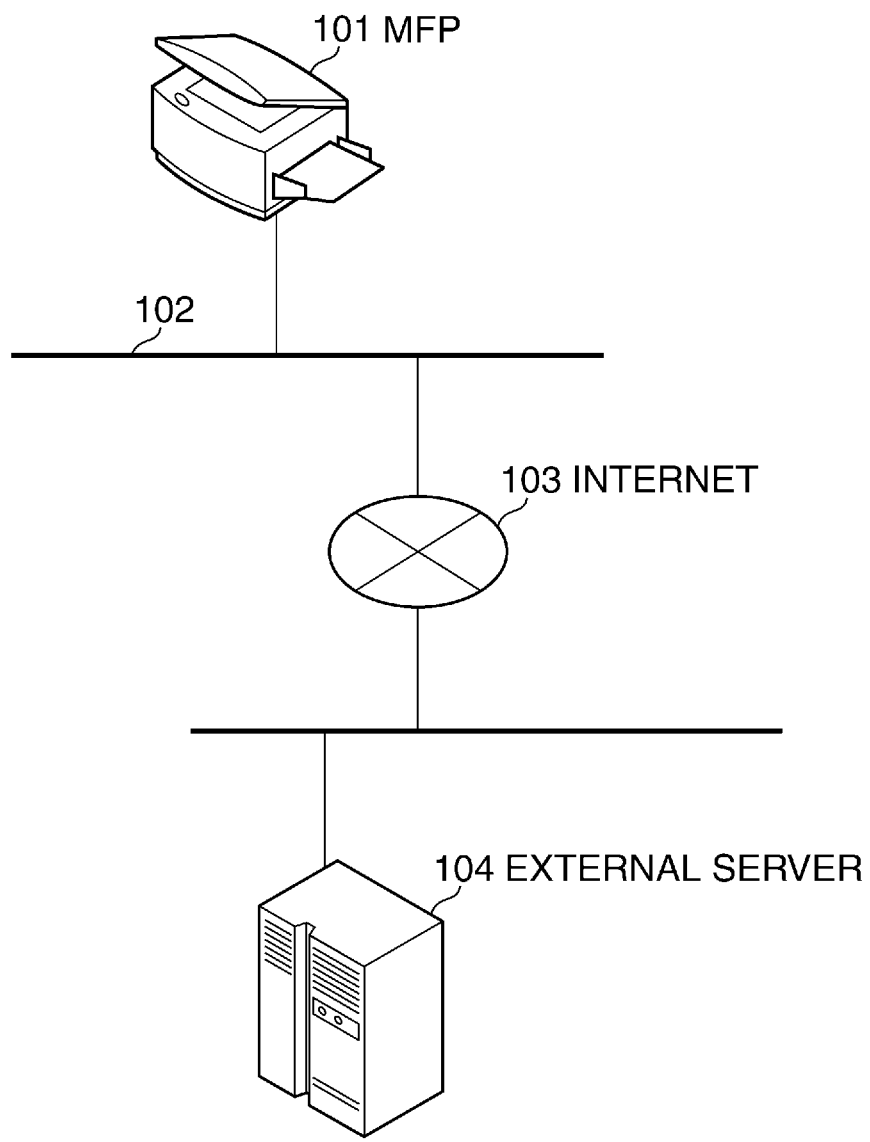
FIG. 1 is a view showing a network system including an MFP as an information processing apparatus according to a first embodiment of the present invention.

FIG. 1 is a view showing an example of a network system including an MFP (multifunction peripheral) as an information processing apparatus according to a first embodiment of the present invention.

In this network system, a multi-function peripheral (MFP) 101, which is an example of the information processing apparatus, is connected to an external server (external apparatus) 104 via a network (e.g. a LAN (local area network) 102 and the Internet 103). The MFP 101 communicates with the external server 104 using the HTTP protocol. The HTTP protocol is provided with a request header section as an HTTP header section, and the request header section includes an Accept-Language request-header field.

The MFP 101 illustrated in FIG. 1 has a copy function for forming an image on a sheet based on scan data obtained by scanning a paper medium (original). The MFP 101 is equipped with a web browser for viewing web sites provided by the external server 104. The external server 104 has a function for transmitting contents stored therein in response to requests from the MFP 101 as a client, i.e. the web browser.

Figure 2:
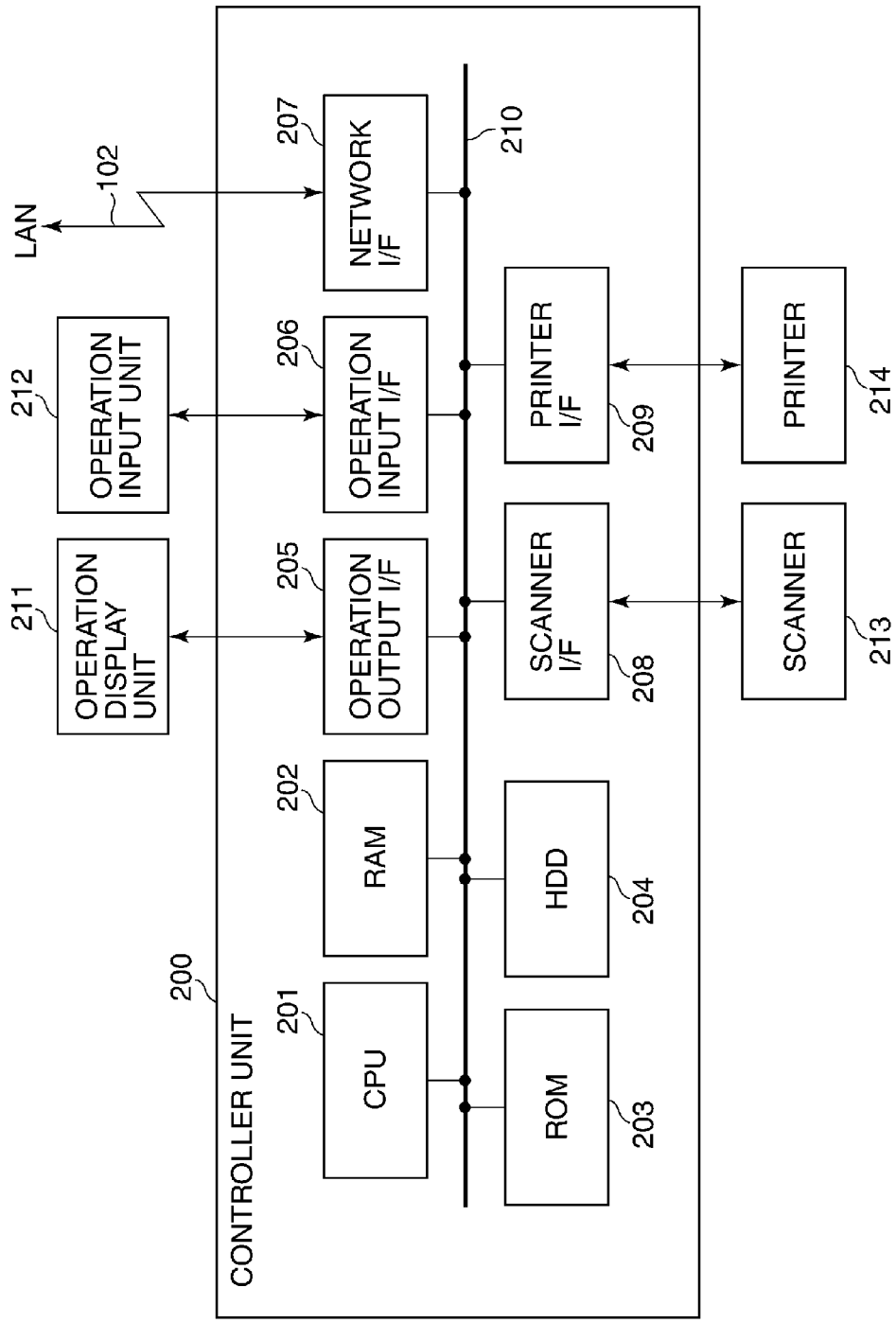
FIG. 2 is a block diagram of the MFP shown in FIG. 1.

FIG. 2 is a block diagram of the MFP 101 shown in FIG. 1.

The MFP 101 includes a controller unit 200. To the controller unit 200 are connected not only a scanner 213 and a printer 214 but also an operation display unit 211, an operation input unit 212, and the LAN 102. The controller unit 200 includes a CPU (central processing unit) 201 for executing various kinds of control programs. The CPU 201 starts up the MFP 101 by a boot program stored in a ROM (read only memory) 203. Then, the CPU 201 reads control programs stored in an HDD (hard disk drive) 204, and executes predetermined processes using a RAM (random access memory) 202 as a work area.

The HDD 204 stores the above-mentioned various control programs including the function of the web browser 302. Further, HDD 204 stores scan data read from the scanner 213 and data acquired from outside via a network interface (I/F) 207.

An operation output interface (I/F) 205 controls communication for outputting data to the operation display unit 211. An operation input interface (I/F) 206 controls communication for inputting data from the operation input unit 212.

The network interface 207 is connected to the LAN 102 and controls input and output of information from and to the LAN 102. A scanner interface (I/F) 208 inputs image data (scan data) from the scanner 213, and performs input and output of scanner control data.

A printer interface (I/F) 209 outputs image data to the printer 214, and performs input and output of printer control data. These blocks are interconnected via a system bus 210.

The operation input unit 212 includes input devices, such as a touch panel and hard keys, and is used as an input interface for receiving instructions from the user. The operation display unit 211 includes display devices, such as an LCD (liquid crystal display) and LEDs (light emitting diodes), and is used as a display interface for the user.

The scanner 213 includes an optical reading device, such as a CCD (charge coupled device), and optically scans, i.e. reads a paper medium, to output image data. The printer 214 forms an image on a recording medium, such as a sheet, based on the image data by an electrophotographic process, for example.

Figure 3:
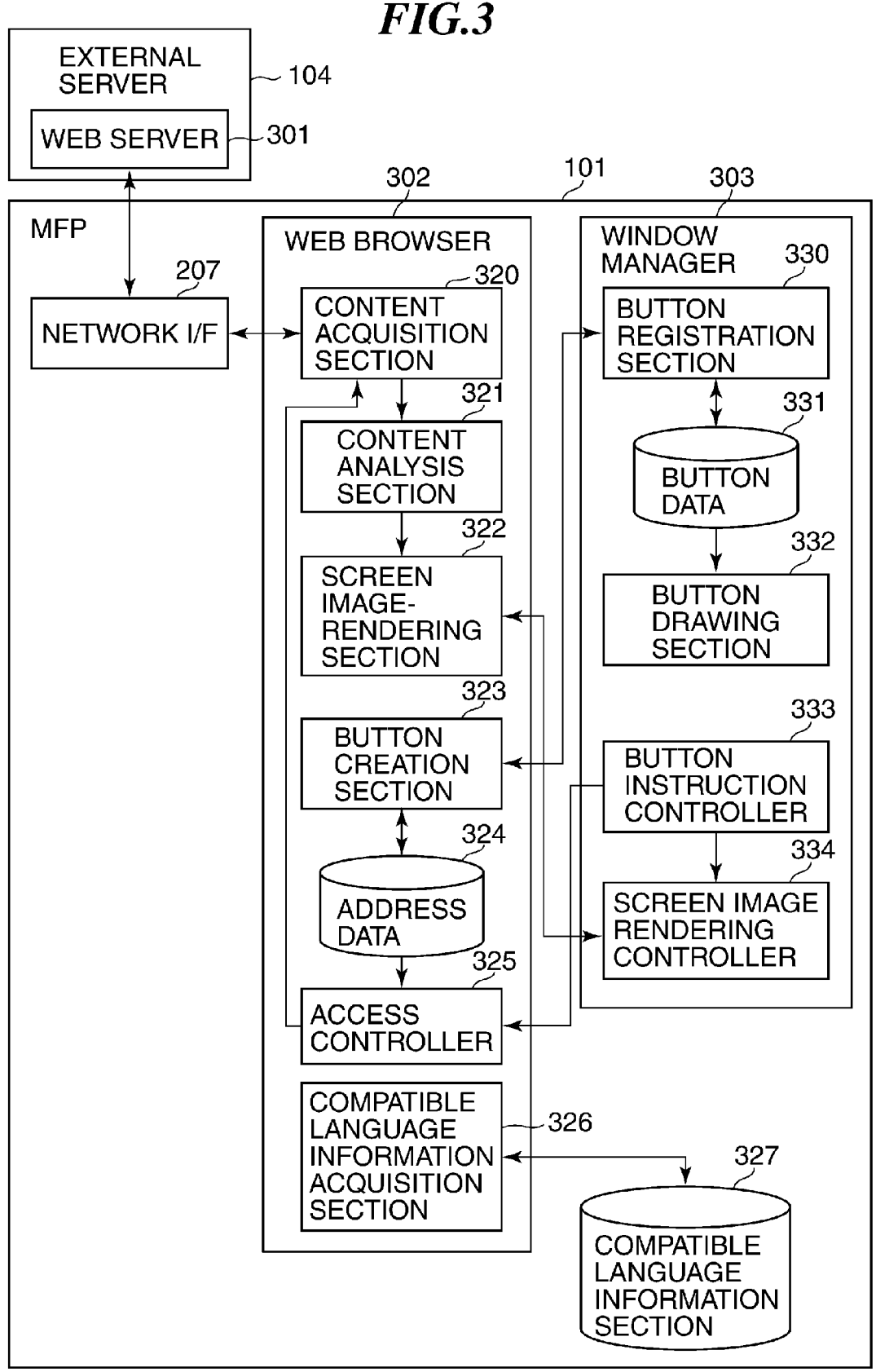
FIG. 3 is a view useful in explaining software configurations of the MFP and an external server shown in FIG. 1.

FIG. 3 is a view useful in explaining software configurations of the MFP 101 and the external server 104 shown in FIG. 1.

Referring to FIG. 3, the web browser 302 and a window manager 303 operate on the MFP 101. The web browser 302 and the window manager 303 operate as the CPU 201 reads out control programs associated therewith stored in the ROM 203 or the HDD 204 and executes them.

The network interface 207 communicates with the external server 104 via the LAN 102 and the Internet 103 in order to receive services provided by external Web sites. Specifically, the web browser 302 transmits a request message to a web server 301 that provides services from the external server 104, and receives a response message transmitted from the web server 301.

Further, the web browser 302 acquires web contents from the web server 301, and displays the web contents on the operation display unit 211 (FIG. 2). Then, the web browser 302 transmits a request to the web server 301 via the network according to a user instruction input from the operation input unit 212.

The web browser 302 comprises a content acquisition section 320, a content analysis section 321, a screen image-rendering section 322, a button creation section 323, an access controller 325, and a compatible language information acquisition section 326.

The content acquisition section 320 transmits a request for acquiring contents to the web server 301 via the network interface 207. Then, the content acquisition section 320 receives a response transmitted from the web server 301 as the contents.

The content analysis section 321 analyzes the contents acquired by the content acquisition section 320, and creates a screen for displaying the contents on the operation display unit 211. The screen image-rendering section 322 displays the screen created by the content analysis section 321 on the operation display unit 211. Specifically, in a case where an image rendering instruction is received from the window manager 303, the screen image-rendering section 322 performs renders a screen image on the operation display unit 211. Further, the screen image-rendering section 322 creates a screen required for performing an operation for registering a favorite item in the web browser 302, and renders an image of the screen on the operation display unit 211.

When a favorite item registration operation is performed on the operation input unit 212, the button creation section 323 requests the window manager 303 to register a display button of a favorite item. After requesting the registration of a display button, the button creation section 323 receives an ID (unique identifier) of a registered display button from the window manager 303. Then, the button creation section 323 stores the ID of the display button as address data 324 in a state associated with the URL of the external web server 301 (i.e. URL for identifying the content). The address data 324 is stored in the RAM 202 or the HDD 204.

When the button (view button) registered by a button registration section 330 is selected by the user, the access controller 325 receives a notification to this effect from the window manager 303. Upon receipt of the notification, the access controller 325 reads out the URL associated with the ID of the registered button from the address data 324. Then, the access controller 325 instructs the content acquisition section 320 to make a content acquisition request to the web server 301. As described above, a URL is defined for a registered button, i.e. a favorite display button.

The compatible language information acquisition section 326 acquires compatible language information, with which the MFP 101 is compatible (that is, which the MFP 101 can use), as language-type information, from a compatible language information section 327. The compatible language information section 327 stores language-type information with which the MFP 101 is compatible. For example, if languages with which the MFP 101 is compatible are Japanese, English, and German languages, the compatible language information section 327 stores, using these three languages as language types, IDs of the languages or identifiable identification information thereon, as language-type information. Further, the compatible language information section 327 also stores the number of types of compatible languages.

Similarly, the window manager 303 may acquire compatible language information from the compatible language information section 327, select the type of a language to be displayed on the operation display unit 211, and display the language by switching between the compatible languages.

The compatible language information section 327 is stored in the RAM 202 or the HDD 204 (storage unit).

The window manager 303 switches between the screen of the web browser 302 and the screens of the other applications, displayed on the operation display unit 211. Further, the window manager 303 displays and controls buttons for switching the screens of the applications. The window manager 303 comprises the button registration section 330, a button drawing section 332, a button instruction controller 333, and a screen image rendering controller 334.

The button registration section 330 receives a request from the button creation section 323 and registers a favorite display button using the web browser 302. In doing this, the button registration section 330 issues the ID of the registered button, and notifies the button creation section 323 of the ID. The button registration section 330 issues an ID on a favorite display button (view button) basis. The types and IDs of applications registered by the button registration section 330 are stored as button data 331 in a state associated with each other. The button data 331 is stored in the RAM 202 or the HDD 204.

The button drawing section 332 draws registered buttons on a button display screen displayed by the window manager 303. In a case where a user instruction input from the operation input unit 212 is for selecting one of the registered buttons, the button instruction controller 333 sends a notification to an application registered in the selected button.

If the button selected by the user is a favorite registered button of the web browser 302, the button instruction controller 333 notifies the access controller 325 of the registered ID of the selected registered button.

In response to an instruction from the button instruction controller 333, the screen image rendering controller 334 switches the screen displayed on the operation display unit 211 to a screen of an application registered in the selected button. Specifically, the screen image rendering controller 334 issues an image rendering request to the application registered in the selected button.

If the button selected by the user is a favorite registered button of the web browser 302, the screen image rendering controller 334 issues a request for displaying a screen of the web browser to the screen image-rendering section 322.

Figure 4:
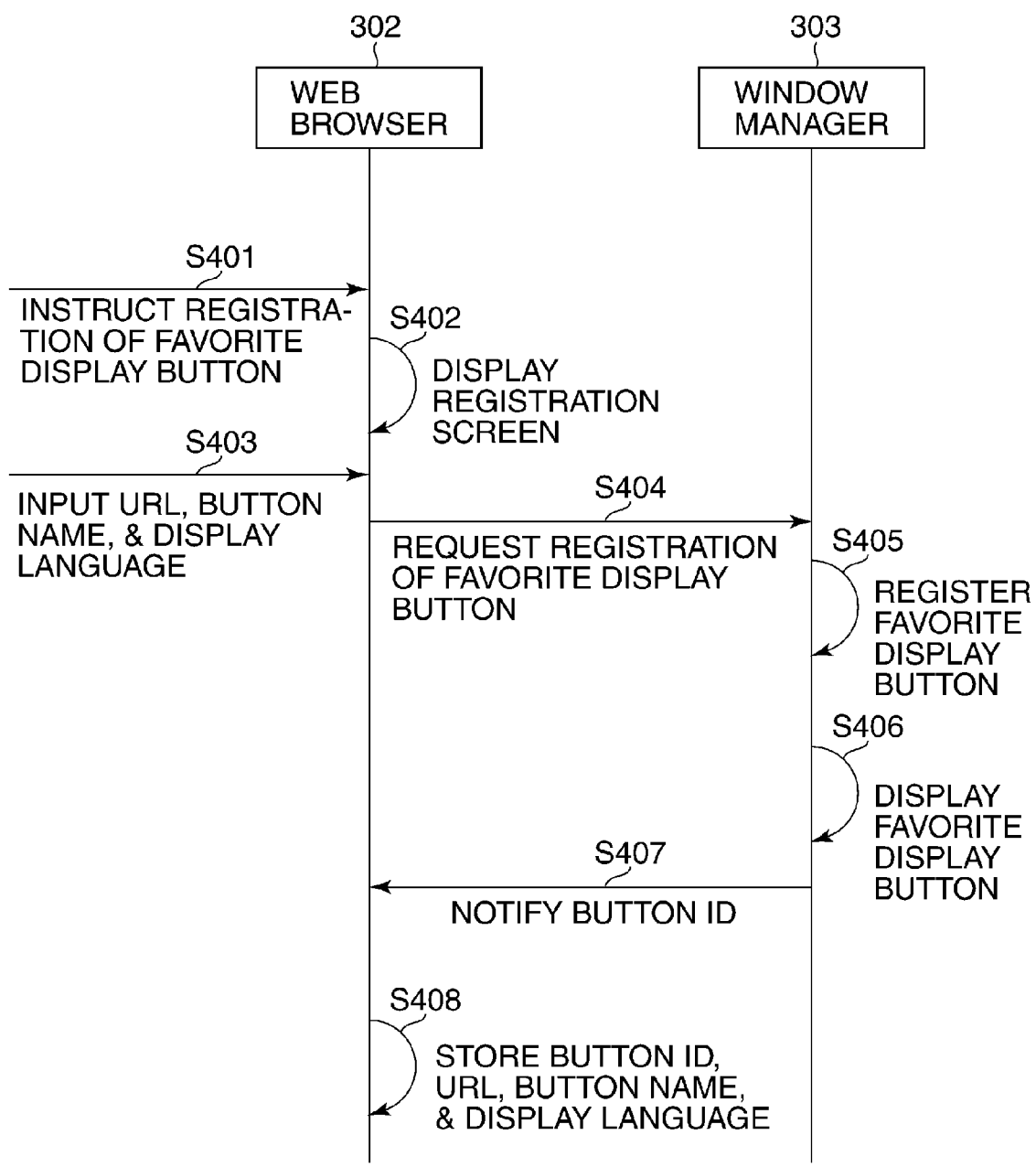
FIG. 4 is a sequence diagram useful in explaining a series of processes executed when a button is registered as a favorite item in a web browser in the MFP shown in FIG. 3.

FIG. 4 is a sequence diagram useful in explaining a series of processes executed for registering a button of a favorite item in the web browser 302 on the MFP 100 shown in FIG. 3. The illustrated sequence is performed by the CPU 201 included in the MFP 101 through execution of a control program thereby.

Now, the user instructs registration of a favorite display button (also referred to as a "view button") via the operation input unit 212 (step S401). An operation for instructing the registration is performed e.g. by selecting a favorite display button registration menu option in the operation menu of the web browser, displayed on the operation display unit 211. In response to the registration instruction, the web browser 302 displays a favorite display button registration screen on the operation display unit 211 (step S402).

Figure 5:
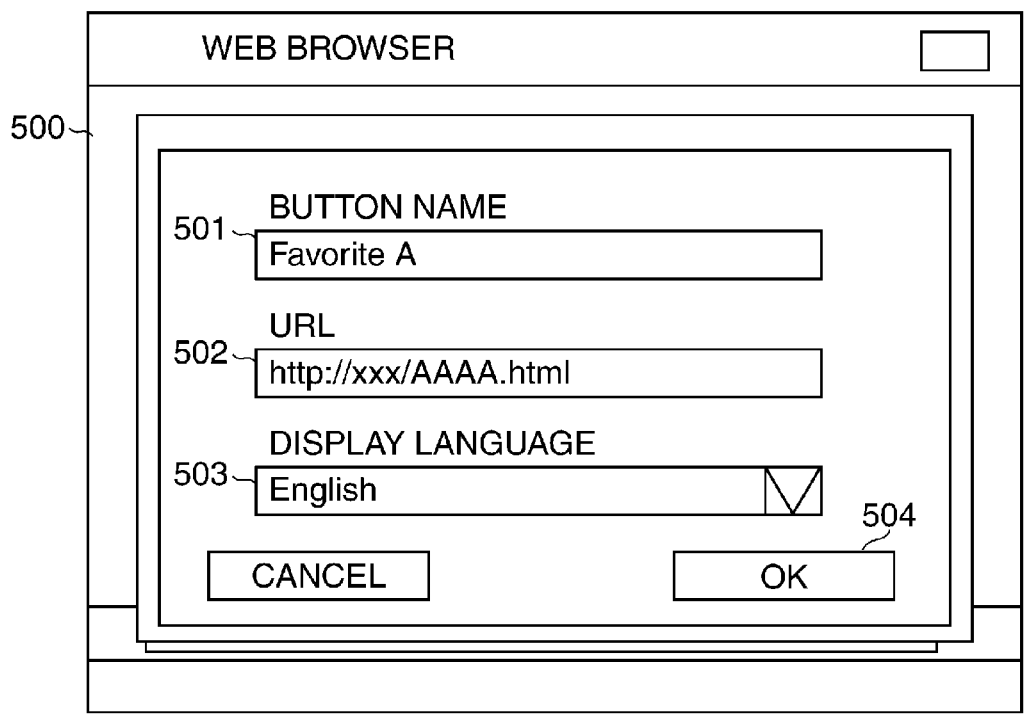
FIG. 5 is a view showing an example of a favorite display button registration screen, described with reference to FIG. 4.

FIG. 5 shows an example of the favorite display button registration screen, described with reference to FIG. 4.

Referring to FIG. 5, as described above, the favorite display button registration screen 500 is displayed when an operation is performed for selecting the favorite display button registration menu option from the operation menu of the web browser. The favorite display button registration screen 500 includes a button name area 501 to which the button name of the favorite display button is input. The URL address of the favorite is input to a URL area 502. Further, the favorite display button registration screen 500 includes a display language input area 503 to which a display language desired to be requested is input.

Furthermore, on the favorite display button registration screen, it is also possible to set the title of contents of a web site currently displayed by the web browser, by default.

The URL address of the web site currently displayed by the web browser can be set in the URL area 502 by default. Further, in the display language input area 503, a list of language types acquired by the compatible language information acquisition section 326 can be displayed in a drop-down list for selection therefrom. At this time, a default value of the display language may be set to a display language in which the web site is currently displayed on the MFP 101. In addition, the user can directly input a value (data item) to each associated one of the above-described areas, and modify the value (data item).

As described hereinabove, the user designates the button name of a favorite display button, the URL address of the favorite, and a display language desired to be requested, by using the favorite display button registration screen 500 (step S403). Then, when the user depresses an OK button 504, the values input to the respective areas described above are finally determined, and a request for registering the favorite display button is issued to the button creation section 323 of the web browser 302 via the operation input interface 206.

Upon receipt of the button registration request, the button creation section 323 requests the button registration section 330 of the window manager 303 to register the favorite display button (step S404). In doing this, the button creation section 323 specifies the button name received in the step S403, for the button registration section 330.

In response to the button registration request, the button registration section 330 registers the button requested to be registered (step S405). Then, the button registration section 330 generates the ID of the registered button, and associates the ID with the type of an application requested to be registered in the button, the button name of the button, and position information on the button, to thereby store the resulting data as button data 331. Subsequently, in the window manager 303, the button drawing section 332 displays the registered favorite display button on a main menu screen (step S406).

Next, the window manager 303 notifies the web browser 302 of the ID of the button generated in the step 406 (step S407). The web browser 302 stores the ID of the button received from the window manager 303 together with the button name, the URL address, and the display language, as address data 324 (step S408). This completes the registration of the favorite display button.

FIG. 6 is a view showing an example of an address data table storing address data described with reference to FIG. 3.

In the illustrated address data table, the number of registered favorite display buttons (total number of favorites: "3" in the illustrated example) stored as address data is recorded, and the respective favorite display buttons have "favorite" numbers added thereto. Further, "items" and "values" are recorded in association with each "favorite" number.

As "items", a favorite number, a button ID, a button name, a URL address, and a display language are recorded. In the illustrated example, as "items" associated with "favorite" number 1, there are recorded "1" as button ID, "Favorite A" as button name, and "http://xxx/AAAA" as URL. Further, in "favorite" number 1, the display language is set to "jp", which means the Japanese language.

As described above, it is possible to store each language designated as a display language, in the form of a predetermined abbreviation (value). Further, the stored value can be used as an information value (value of the Accept-Language request-header field of the HTTP request header section) of a display language desired to be requested, referred to hereinafter.

Note that in favorite number "2", the display language is set to "en", which means the English language, and in favorite number "3", the display language is set to "de", which means the German language.

Figure 7:
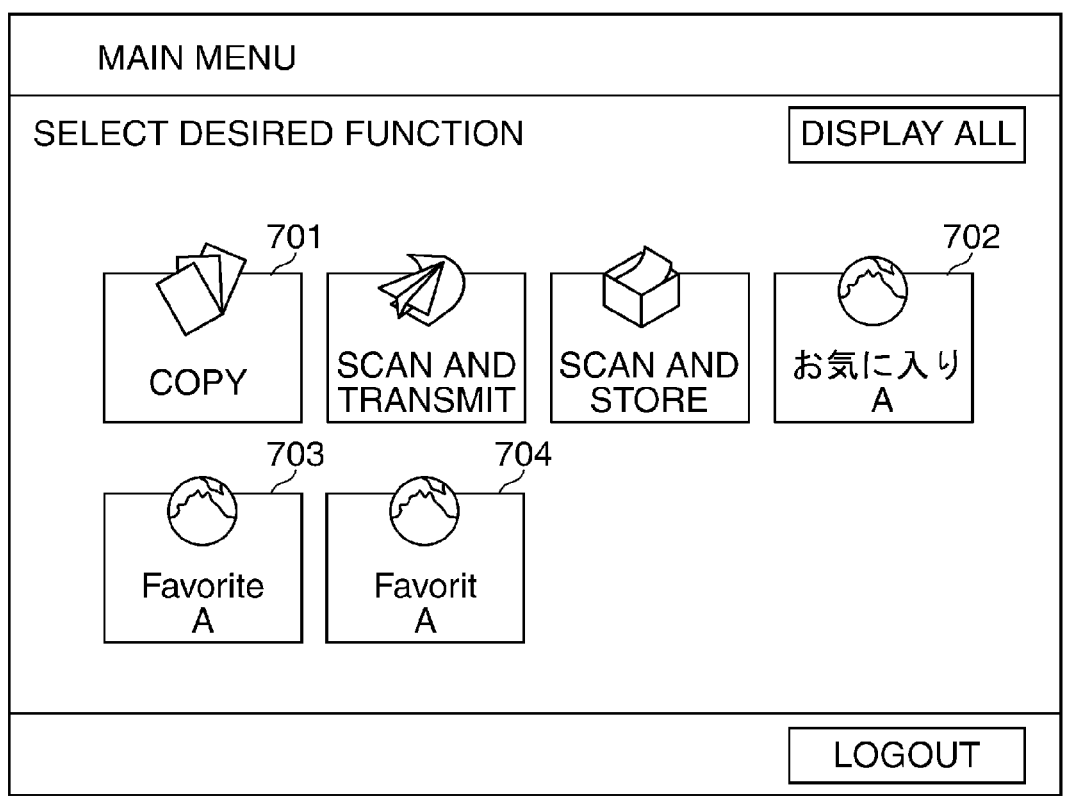
FIG. 7 is a view showing an example of a main menu screen including favorite display buttons, displayed in an operation display unit shown in FIG. 2.

FIG. 7 is a view showing an example of a main menu screen including favorite display buttons, displayed on the operation display unit 211 shown in FIG. 2.

As described hereinabove, on the illustrated main menu screen, the screen image rendering controller 334 causes buttons generated by the button drawing section 332 and a screen generated by the screen image-rendering section 322 to be displayed on the operation display unit 211 in such a manner that the former are superimposed on the latter.

A button 701 is displayed on the illustrated main menu screen. This button 701 is associated with the copy function provided by the MFP 101. Further, buttons 702, 703 and 704 are favorite display buttons for use in accessing favorite web sites, respectively.

As described above, the main menu screen displays buttons corresponding to the functions equipped in the MFP 101 and favorite display buttons. Further, the favorite display buttons 702 to 704 are each displayed with an image display and a button name.

Now, when the user selects the button 702, the window manager 303 switches the screen to the web browser 302. The web browser 302 refers to a URL associated with a stored button ID based on a button ID notified from the window manager 303. Then, the web browser 302 transmits a request to a web site with the URL.

Figure 8:
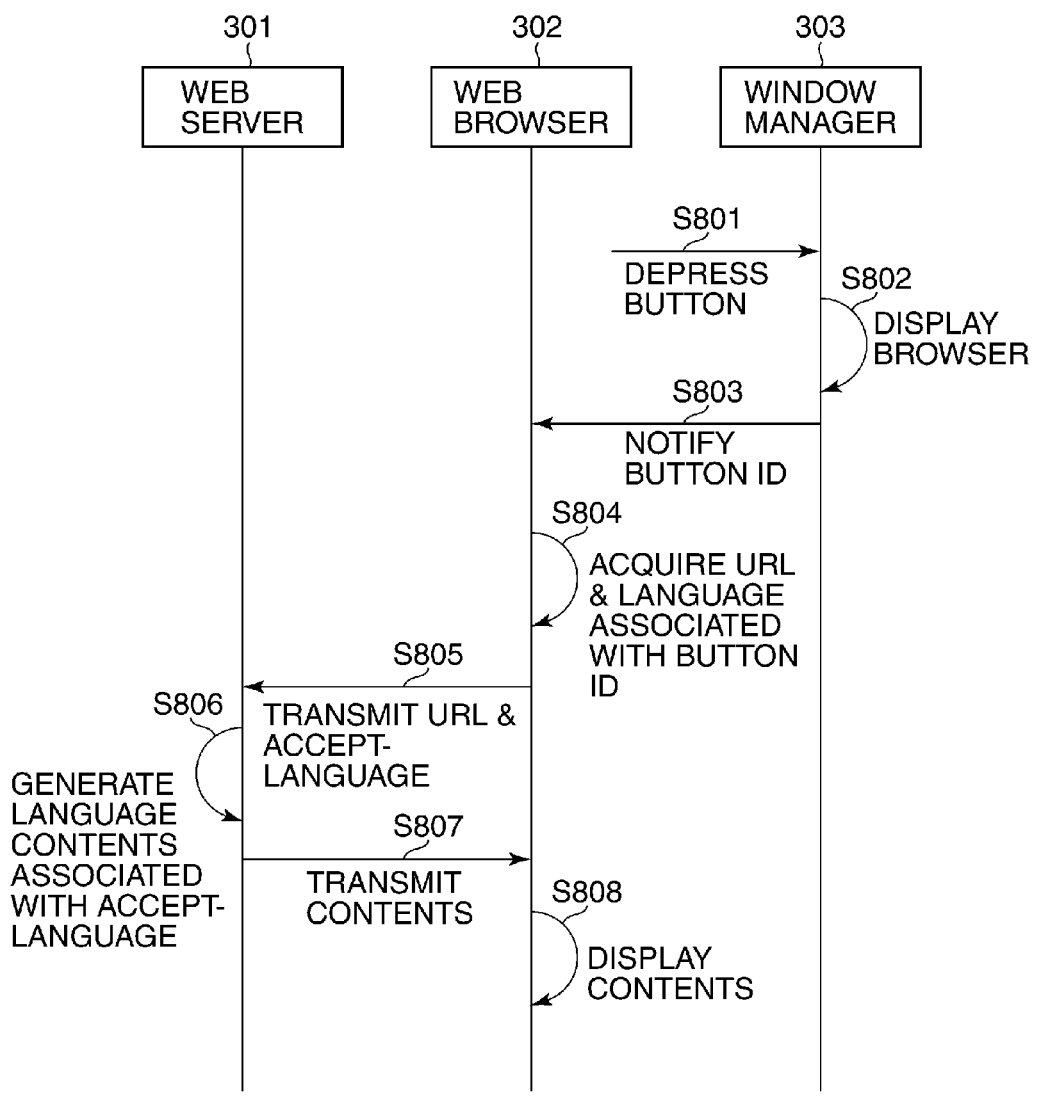
FIG. 8 is a sequence diagram useful in explaining processing executed when one of the favorite display buttons shown in FIG. 7 is selected.

FIG. 8 is a sequence diagram useful in explaining processing executed when one of the favorite display buttons shown in FIG. 7 is selected.

Now, let it be assumed that the user depresses one of the buttons 702 to 704 shown in FIG. 7 (step S801). The button instruction controller 333 of the window manager 303 compares position information on the depressed button with position data of the button data 331. As a result of the comparison, if it is determined that a favorite display button has been selected, the button instruction controller 333 starts up the web browser 302 and performs switching of the screen (step S802). Then, the button instruction controller 333 notifies the access controller 325 of the web browser 302 of a button ID associated with the selected favorite display button (step S803).

The access controller 325 acquires the URL of a web site to be accessed by the web browser 302 and a display language from the address data 324 based on the notified button ID (step S804). The web browser 302 transmits a request for acquiring contents to the URL using the content acquisition section 320 (step S805). When generating an HTTP request header, the content acquisition section 320 describes the code of the display language in the Accept-Language request-header field.

For example, assuming that the favorite display button 702 appearing in FIG. 7 is depressed in the step S801, the web browser 302 acquires "jp" as the display language from the address data table shown in FIG. 6. Therefore, the web browser 302 (more specifically, the content acquisition section 320) describes "jp" in the Accept-Language request-header field of the HTTP request header.

Upon receipt of the HTTP request header from the client, the web server 301 generates the contents in the display language described in the Accept-Language request-header field according to the HTTP request header (step S806). Then, the web server 301 transmits the contents to the web browser 302 as the client (step S807). Upon receipt of the contents, the web browser 302 displays the contents on the operation display unit 211, as described hereinabove (step S808).

As described heretofore, in the first embodiment, display language information items desired to be requested can be separately registered in the favorite display buttons, so that simply by depressing the favorite display button, it is possible to designate a display language and acquire the contents in the display language.

Next, an MFP as an example of the information processing apparatus according to a second embodiment of the present invention will be described. Note that the arrangement of the MFP according to the second embodiment is the same as the arrangement described with reference to FIGS. 2 and 3, and hence description thereof is omitted.

FIG. 9 is a sequence diagram useful in explaining a series of processes executed when a button is registered as a favorite item in a web browser running on the MFP as the information processing apparatus according to the second embodiment. Note that the sequence shown in FIG. 9 is executed by the CPU 201 shown in FIG. 2 through execution of a control program.

Referring to FIGS. 2, 3, and 9, the user instructs registration of a favorite display button using the operation input unit 212 (step S901). An operation for instructing the registration is performed e.g. by selecting a favorite display button registration menu option in the operation menu of the web browser, displayed on the operation display unit 211.

In response to the registration instruction, the web browser 302 displays a favorite display button registration screen on the operation display unit 211 (step S902). The display language input area 503 illustrated in FIG. 5 is removed from the favorite display button registration screen displayed in the step S902.

The user designates a button name and a URL address on the favorite display button registration screen, as described with reference to FIG. 5 (step S903). Then, when the user depresses the OK button 504 on the favorite display button registration screen, the compatible language information acquisition section 326 acquires compatible language information from the compatible language information section 327 (step S904). More specifically, the compatible language information acquisition section 326 of the web browser 302 accesses the compatible language information section 327, and acquires the number of languages (language types) and the language types associated with the button name, which are registered in advance.

Then, a repetitive process is repeatedly executed the number of times corresponding to the number of languages, based on the acquired number of languages and language types (step S905). That is, the repetitive process in the step S905 is performed on a display language-by-display language basis. In the repetitive process, first, the web browser 302 automatically determines a display language and a button name according to a first language type (language information) (step S906). Hereinafter, this button name is referred to as the "determined button name".

Note that the above display language can be used as the value (value of the Accept-Language request-header field of the HTTP header section) of a display language desired to be requested, referred to hereinafter. For example, when the language type is English, "en" is used, and when the language type is German, "de" is used. Further, the determined button name is set to a name obtained by connecting the button name designated in the step S903 and the language type. If the button name designated in the step S903 is "Favorite A", the determined button name is "Favorite A_en" in which the character string of the button name and "en" representing English are connected.

Next, the web browser 302 transmits a request for acquiring the contents of the display language to the URL address designated in the step S903 (step S907). When generating the HTTP request header, the web browser 302 describes the code of the display language determined in the step S904 in the Accept-Language request-header field.

For example, in a case where the code of the display language determined in the step S904 is "jp", the web browser 302 describes "jp" in the Accept-Language request-header field of the HTTP request header.

Then, the web server 301 generates the contents of the display language described in the Accept-Language request-header field according to the HTTP request header received from the client (step S908). Next, the web server 301 transmits the contents to the web browser 302 which is the client (step S909).

In a case where the web server 301 cannot generate the contents of the display language described in the Accept-Language request-header field, the web server 301 generates contents in the default display language, and then transmits the default contents to the web browser 302. Note that in this case, instead of generating and transmitting the default contents, the web server 301 may transmit an error notification notifying e.g. a server error to the web browser 302.

The web browser 302 checks the contents (step S910). More specifically, the content analysis section 321 checks the language in which the contents are described, by referring to the language information in the contents header field. At this time, the transmitted Accept-Language (the display language determined in the step S906) is also confirmed.

The content analysis section 321 checks whether or not the display language determined in the step S906 and the language information in the contents header field match each other (step S911). If the determined display language and the language information in the contents header field do not match each other (NO to the step S911), the process returns to the step S906 so as to perform a button registration process on the next language type.

Note that assuming that the received contents are an error notification, the answer to the question of the step S911 becomes negative (NO), similarly to the above, the process returns to the step S906 so as to perform a button registration process on the next language type.

On the other hand, if the determined display language and the language information of the contents match each other (YES to the step S911), the button creation section 323 of the web browser 302 requests the button registration section 330 of the window manager 303 to register the corresponding button (step S912). In doing this, the button creation section 323 specifies the button name determined in the step S906 for the button registration section 330.

The button registration section 330 registers the button in response to the registration request (step S913). Then, the button registration section 330 associates the ID with the type of an application requested to be registered in the button, the button name of the button, and position information on the button, to thereby store the resulting data as button data 331 (step S913). After completion of the button registration, the button drawing section 332 displays the button on the main menu screen according to the button data 331.

The window manager 303 notifies the web browser 302 of the button ID (step S914). The web browser 302 stores the button ID together with the button name and the display language determined in the step S906, as address data 324 (step S915). At this time, the URL address designated in the step S903 is also stored as the address data 324.

As described hereinabove, in the second embodiment, the favorite display button is automatically registered. In the second embodiment as well, display language information items desired to be requested can be separately registered in respective favorite display buttons, so that simply by depressing the favorite display button, it is possible to designate a display language and acquire the contents in the display language.

Although in the above-described embodiments, the information processing apparatus is described by taking the MFP as an example, the information processing apparatus may be provided as another information processing apparatus, such as a personal computer and a mobile phone.

As is apparent from the above description, in FIG. 3, the web browser 302 and the window manager 303 cooperatively function not only as a registration unit, a display control unit, and an access unit but also as an inquiry unit and a determination unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the functions of either of the above-described embodiments can be accomplished by causing the information processing apparatus to execute the functions as a control method. Further, the functions of either of the above-described embodiments may be accomplished by causing a computer incorporated in the information processing apparatus to execute a program implementing the functions, as a control program. Note that the control program is stored e.g. in a computer-readable storage medium.

In this case, each of the control method and the control program includes at least registration, display control and access.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-187105 filed Aug. 30, 2011, which is hereby incorporated by reference herein in its entirety.

What is claimed is:

1. A client apparatus communicable with a server apparatus via a network, the client apparatus comprising:
a processor; and
a memory storing instructions that, when executed by the processor, cause the client apparatus to:
register shortcut buttons for displaying web pages, each button corresponding to at least a URL and a display language;
display an operation screen including the registered shortcut buttons;
detect a user operation for selecting one of the shortcut buttons in the displayed operation screen; and
transmit to the server apparatus, in response to the detection of the user operation, a request for a web page based on a URL corresponding to the selected shortcut button, the request including a code of a display language corresponding to the selected shortcut button, to thereby receive the web page associated with the display language.

2. The client apparatus according to claim 1, wherein when instructed to register the shortcut button, the instructions further cause the client apparatus to display a registration screen on the operation screen, receive inputs of the URL, the display language, and a button name which is a name of the shortcut button, add a unique identifier to the shortcut button, and register the URL, the display language, and the button name.

3. The client apparatus according to claim 2, wherein the instructions further cause the client apparatus to display the shortcut button together with the button name, on the operation screen.

4. The client apparatus according to claim 2, wherein when inputting the display language from the registration screen, the instructions further cause the client apparatus to cause a language compatible with the client apparatus to be selected.

5. The client apparatus according to claim 1, wherein the memory stores compatible language information indicative of display languages compatible with the client apparatus,
wherein when instructed to register the shortcut button, the instructions further cause the client apparatus to display a registration screen on the operation screen, and
wherein when the URL is input on the registration screen, the instructions are further configured to determine the display language according to the compatible language information.

6. The client apparatus according to claim 5, wherein the instructions further cause the client apparatus to:
inquire, when each display language is determined, of the server apparatus, on a determined language basis, as to whether or not the web page identified by the URL can be viewed in the display language; and
determine according to a result of the inquiry whether or not the web page can be viewed in the determined display language,
wherein, if it is determined that the web page can be viewed in the determined display language, the instructions are further configured to register the determined display language.

7. The client apparatus according to claim 5, wherein the instructions further cause the client apparatus to determine a button name, which is a name of the shortcut button, based on the URL and the determined display language.

8. The client apparatus according to claim 1, wherein the instructions further cause the client apparatus to transmit a request after describing the display language in an Accept-Language request-header field included in a request header of the request based on HTTP protocol.

9. A method of controlling a client apparatus communicable with a server apparatus via a network, the method comprising:
registering shortcut buttons for displaying web pages, each button corresponding to at least a URL and a display language;
displaying an operation screen including the registered shortcut buttons;
detecting a user operation for selecting one of the shortcut buttons in the displayed operation screen; and
transmitting to the server apparatus, in response to the detection of the user operation, a request for a web page based on a URL corresponding to the selected shortcut button, the request including a code of a display language corresponding to the selected shortcut button, to thereby receive the web page associated with the display language.

10. A non-transitory computer-readable storage medium storing a computer-executable control program for causing a computer to execute a method of controlling a client apparatus communicable with a server apparatus via a network, wherein the method comprises:

registering shortcut buttons for displaying web pages, each button corresponding to at least a URL and a display language;

displaying an operation screen including the registered shortcut buttons;

detecting a user operation for selecting one of the shortcut buttons in the displayed operation screen; and transmitting to the server apparatus, in response to the detection of the user operation, a request for a web page based on a URL corresponding to the selected shortcut button, the request including a code of a display language corresponding to the selected shortcut button, to thereby receive the web page associated with the display language.

* * * * *